United States Patent
Henneken et al.

(10) Patent No.: US 6,550,593 B2
(45) Date of Patent: Apr. 22, 2003

(54) METHOD TO ACCELERATE TORQUE TRANSMITTING CONDITIONS WITHIN A CLUTCH

(75) Inventors: Markus Henneken, Kressbronn (DE); Hansjörg Rosi, Meckenbeuren (DE)

(73) Assignee: ZF Friedrichshafen AG, Friedrichshafen (DE)

(*) Notice: Subject to any disclaimer, the term of this patent is extended or adjusted under 35 U.S.C. 154(b) by 0 days.

(21) Appl. No.: 09/900,683

(22) Filed: Jul. 6, 2001

(65) Prior Publication Data
US 2002/0038746 A1 Apr. 4, 2002

(30) Foreign Application Priority Data

Jul. 21, 2000 (DE) .......................................... 100 35 474

(51) Int. Cl.⁷ ............................................... F16D 48/06
(52) U.S. Cl. ........................................ 192/3.58; 701/66
(58) Field of Search ........................... 192/3.58, 109 F; 701/66, 67, 87

(56) References Cited

U.S. PATENT DOCUMENTS

| | | | | |
|---|---|---|---|---|
| 4,653,350 A | * | 3/1987 | Downs et al. | 701/66 |
| 5,046,174 A | * | 9/1991 | Lentz et al. | 701/66 |
| 5,058,460 A | * | 10/1991 | Hibner et al. | 192/109 F |
| 5,072,390 A | * | 12/1991 | Lentz et al. | 701/66 |
| 5,720,374 A | * | 2/1998 | Dadel et al. | 192/109 F |
| 5,853,076 A | | 12/1998 | McKee et al. | 192/87.14 |
| 6,285,942 B1 | * | 9/2001 | Steinmetz et al. | 192/109 F |

FOREIGN PATENT DOCUMENTS

DE          197 08 287 A1   *  9/1997

* cited by examiner

Primary Examiner—Rodney H. Bonck
(74) Attorney, Agent, or Firm—Davis & Bujold, P.L.L.C.

(57) ABSTRACT

Within the scope of the method for acceleration of the torque breakdown of clutches in automatic transmissions, the follow-up of the hydraulic pressure and therewith the torque breakdown are accelerated by an over-compensation in the control.

5 Claims, 1 Drawing Sheet

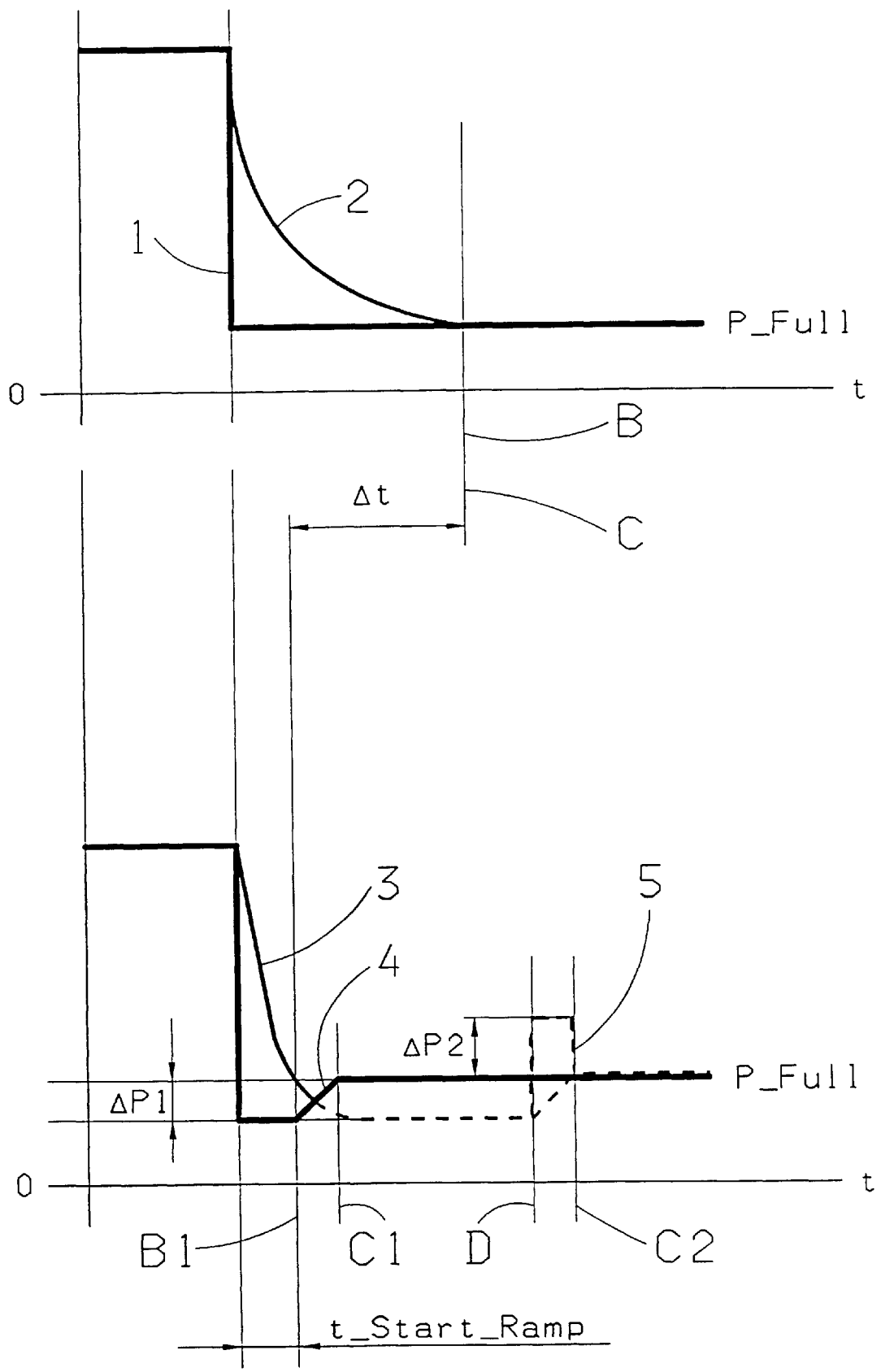

METHOD TO ACCELERATE TORQUE TRANSMITTING CONDITIONS WITHIN A CLUTCH

FIELD OF THE INVENTION

The invention concerns a method for accelerating the torque reduction of clutches in automatic transmissions.

BACKGROUND OF THE INVENTION

Constantly increasing demands are being made at present on the functionality of automatic transmission: on one hand, more spontaneity is required, on the other hand, the clutches for different gear shifts are being repeatedly used to take into consideration the more compact design of the transmissions. Besides, the driver has a constantly increasing number of gears available to be shifted, the same as the possibility of manual engagement by the driver (tipp function). In addition, the driver must have the possibility of discontinuing or canceling gear shifts.

This results in the engagement and disengagement of the clutches is too slow or in engagement and disengagement at the right moment is becoming more and more difficult.

If, for example, a clutch is not filled enough and, nevertheless, has to become positively engaged at the next moment, this can lead to significant damage to the shifting quality. Conversely, considerable damages to shifting quality in automatic transmissions can result when a clutch takes up the torque too early or when the torque take-up lasts too long According to the prior art, the above described problem is solved by the fact that prohibition times are introduced between the gear shifts. The effect of the prohibition times is that the clutch assumes a well-defined state such as "clutch full" or "clutch empty".

Furthermore, discontinuation or the cancellation of gearshifts are prohibited or allowed only within a very limited scope. During torque build-up, the driving is usually at actual charge pressure whereby a torque take-up of long duration is produced by the follow-up control pressure.

Therefore, the problem on which this invention is based is to obtain as quickly as possible in a positively engaged clutch, a torque reduction and therewith a spontaneous reaction to the rotational speed of the engine.

However, despite the quick torque reduction, the clutch must remain at charge pressure in order to ensure the possibility of discontinuing or canceling gear shifts (immediate torque take-up).

SUMMARY OF THE INVENTION

Accodingly, it is proposed to accelerate the follow-up of the hydraulic pressure and thus the torque reduction by an over-compensation of the control in a positively engaged clutch.

According to the invention, this is achieved by driving the pressure control below the charge pressure level. The torque reduction is accordingly carried out quickly due to the increased pressure difference.

After a certain applicable time over an applicable pressure ramp, it is then returned again to filler pressure in order, by the pressure difference, to ensure or produce the immediate torque take-up again.

For the case that a change of shifting condition or a discontinuation of the shifting operation is carried out, or when the gear shift is canceled, the control abandons the controlled opening pressure. According to the invention, in this case an applicable pressure pulse is controlled in order, by the increased pressure difference, immediately to set the clutch again at charge pressure level so that the torque take-up be ensured. This can also occur by take-up of the time-dependent rapid filling.

BRIEF DESCRIPTION OF THE DRAWING

The method is described, in detail below, with reference to the enclosed FIGURE. In this FIGURE the pressure progress during torque reduction is shown as function of time according to the prior art and according to the instant invention.

DETAILED DESCRIPTION OF THE INVENTION

In the FIGURE, according to the prior art, during torque build-up the driving is at charge pressure (curve 1) by means of the electric control whereby is produced by the follow-up control pressure a long-lasting torque take-up. Curve 2 in the FIGURE corresponds to the progress in time of the follow-up control pressure. At the moment B, the torque reduction terminates and the clutch is ready for torque take-up.

Contrary to the prior art, within the scope of the inventive method during the electric control, the charge pressure P_Full has fallen below by $\Delta$_P1 with the result that the curve 3 of the follow-up control pressure drops more abruptly whereby the torque reduction is carried out more quickly due to the increased pressure difference. The torque reduction terminates at the point B1: it can be seen from the FIGURE, the torque reduction operation is considerably accelerated by $\Delta$_t.

The readiness to immediate torque take-up is ensured by the fact that after a certain applicable time t_start_ramp, which can be as long as desired, the charge pressure P_Full is adjusted via a likewise applicable pressure ramp (curve 4 in the FIGURE). This moment is designated C1 in the FIGURE. The time t_start_ramp depends on the actual attainment of the charge pressure P_Full via the hydraulics.

In the FIGURE is also outlined the case that a change of shifting state or a discontinuation of the shifting operation prior to expiration of the time t_start_ramp is carried out. As already explained in this case, an applicable pressure pulse 5 is controlled so that the charge pressure is exceeded by $\Delta$_P2 (point D). The adjustment of the charge pressure level is accelerated by the increased pressure difference so that the torque take-up at the moment C2 is ensured.

The method shown here is adequate for all clutches which have a hydraulic pressure follow-up to the electric control.

One other advantage of the invention is the increase in spontaneity achieved thereby both at low and at high temperatures.

What is claimed is:

1. A method for accelerating the torque reduction of an electronically controlled clutch in an automatic transmission, the method comprising the steps of:

providing an electronic controller to determine a desired hydraulic charge pressure for the clutch;

applying the desired hydraulic charge pressure to the clutch via a follow-up hydraulic pressure over a time period; and accelerating the torque reduction in the clutch by determining in the electronic controller a lower initial hydraulic charge pressure to lessen the time period within which the follow-up hydraulic pressure brings the clutch to the desired hydraulic charge pressure.

2. The method for accelerating the torque reduction according to claim 1 further comprising the step of opening the clutch and determining the lower initial hydraulic charge as a first pressure difference ($\Delta\_P1$) below the desired hydraulic charge pressure level (P_Full).

3. The method for accelerating the torque reduction according to claim 2 further comprising the step of providing a second time period (t_start_ramp), after which the initial hydraulic charge pressure is adjusted to the desired hydraulic charge pressure via an applicable pressure function (4) to ensure the appropriate torque reduction.

4. The method for accelerating the torque reduction according to claim 1 further comprising the step of carrying out one of a gear shift operation and a discontinuation of a gear shifting operation prior to expiration of the second time period (t_start_ramp); and when the gear shift is discontinued, applying an increased pressure pulse (5) to exceed the desired charge pressure (P_Full) by a second pressure difference ($\Delta\_P2$) in order to immediately set the clutch again at the desired charge pressure (P_Full) so that torque take-up is ensured.

5. A method for accelerating the torque reduction of a positively engaged clutch in an electronically controlled clutch in an automatic transmission, the method comprising the steps of:

providing an electronic controller to determine a desired hydraulic charge pressure for the clutch and a lower initial hydraulic charge pressure as a first pressure difference ($\Delta\_P1$) below the desired hydraulic charge pressure level;

opening the positively engaged clutch by applying a follow-up hydraulic pressure based on the lower initial hydraulic charge pressure over an initial time period;

adjusting the lower initial hydraulic charge pressure to the desired hydraulic charge pressure after the initial time period to accelerate the torque reduction in the clutch and lessen an overall time period within which the follow-up hydraulic pressure brings the clutch to the desired hydraulic charge pressure for enabling torque take-up.

* * * * *